Jan. 8, 1963  J. C. MYERS ET AL  3,072,558
COMPOSITE ANODE
Filed Feb. 13, 1961

INVENTORS.
John C. Myers
Jerome C. Cates, Jr.
BY Earl D. Ayers
AGENT

United States Patent Office 3,072,558
Patented Jan. 8, 1963

3,072,558
COMPOSITE ANODE
John C. Myers and Jerome C. Cates, Jr., Lake Jackson, Tex., assignors to The Dow Chemical Company, Midland, Mich., a corporation of Delaware
Filed Feb. 13, 1961, Ser. No. 89,064
6 Claims. (Cl. 204—280)

This invention relates to anodes for use in electrolytic cells and particularly to composite anodes comprising a plurality of segments of graphite.

Cemented joints that are required to serve as an electrically conductive member have always been a problem to the electronic and electrochemical industry. Certain conductive cements have been marketed which contain particulated silver, graphite powder or other conductive fillers, but these materials are not applicable for usage under all conditions.

Especially severe conditions exist in electrolytic cells where the ambient atmosphere of the anodes is chlorine gas or other corrosive gas which would tend to attack metal conductive particles used in joining together segments of an anode. When cemented joints having powdered graphite as a filler material are used, the joints have been found to have higher resistivity and lower tensile strength than has been desired.

Accordingly, a principal object of this invention is to provide an improved composite anode for use in electrolytic cells.

Another object of this invention is to provide an improved electrically conductive and mechanical bond between segments of graphite.

In accordance with this invention segments of graphite having abutting surfaces adapted to fit together are coated with an adhesive cement such as a phenol formaldehyde resin, for example, on the surfaces to be joined. A graphite cloth, of woven or unwoven form, is then saturated with the cement, placed between the surfaces to be joined, and the graphite segments pressed together and held until the cement has set. A high compressive force during the cementing operation is not required. Graphite cloth and the process of making it is described on page 70 of the May 4, 1959, issue of Chemical Engineering and in advance Technical Information Bulletins 101 HJ and 104 JJ of the National Carbon Co., each published prior to the filing of the instant patent application.

Figure 2:
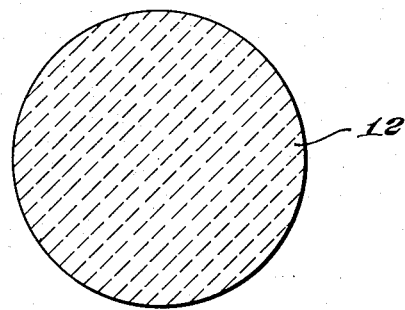
Figure 1:
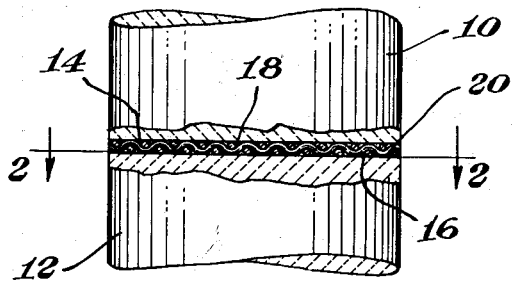

The invention, as well as additional objects and advantages thereof, will best be understood when the following detailed description is read in connection with the accompanying drawing, in which:

FIG. 1 is a side elevational view, in section, of a composite graphite anode made in accordance with this invention, and FIG. 2 is a sectional view taken along the line 2—2 of FIG. 1.

Referring to the drawing, there is shown a pair of anode segments 10, 12 having generally flat surfaces 14, 16 which are adapted to mate together. Each of the surfaces 14, 16 is provided with a coating of cement such as a phenol formaldehyde resin, for example. A layer of graphite cloth 20, saturated with cement 18, is disposed between the surfaces 14, 16. The segments 10, 12 are pressed together as the cement is setting to force the surfaces 14, 16 into contact with the graphite cloth 20, forming a low resistance electrical contact across the joint.

While not essential to the practicing of this invention, additional conductivity across the joint may be provided by loading the cement with finely divided graphite particles.

In practicing the invention a graphite cloth of 28 x 28 weave has been used successfully. The conductivity of the joint was almost twice that of a similar joint using non-conductive cement having particulated graphite as a filler as taught by the prior art. The tensile strength of the joint of the invention was almost twice that of a joint using graphite loaded cement.

While the above tests were made using a phenol formaldehyde resin type of cement, other cements having suitable bonding characteristics may be used. Examples of usable cements are epoxy resin cements and solid polyurethane cements.

While the usable mesh size of the graphite cloth may vary over a considerable range, smaller mesh sizes tend to provide a greater conductive path across the joint. In addition, graphite cloth in the form of felt may be used in practicing this invention. Test results show that joints of such composite modes have electrical resistance characteristics as good or better than when woven graphite cloth is used in making the joints. When this invention is used, for example, high grade active faces of graphite may be bonded to ordinary graphite lumber to provide more economical anodes than when expensive graphite is used to form the entire anode structure.

This application is a continuation-in-part of application Serial No. 60,177, filed October 3, 1960, for "Composite Anode," now abandoned.

What is claimed is:

1. A composite anode for use in an electrolytic cell, comprising at least a pair of segments of graphite having a pair of surfaces adapted to abut against one another, a sheet of graphite cloth, said sheet of graphite cloth being disposed between said segments and in electrically conductive contact with said segments over substantially all of said surfaces, and cement, said cement permeating said cloth and mechanically bonding said surfaces together in pressure contact with said cloth.

2. An anode in accordance with claim 1, wherein said cement is a phenol formadehyde resin.

3. An anode in accordance with claim 1, wherein the mesh size of said cloth is not larger than 28 x 28 mesh.

4. An anode in accordance with claim 1, wherein said cement has particulated graphite dispersed therein.

5. An anode in accordance with claim 1, wherein said cloth is a woven cloth.

6. An anode in accordance with claim 1, wherein said cloth is an unwoven cloth of the felt type.

References Cited in the file of this patent

UNITED STATES PATENTS 2,562,150    Osborne _____ Oct. 27, 1925

FOREIGN PATENTS 68,628    France _____ July 6, 1958
(2d addition to No. 1,080,982)